United States Patent
Lindoff et al.

(10) Patent No.: US 9,374,847 B2
(45) Date of Patent: Jun. 21, 2016

(54) TECHNIQUE FOR OPERATING COMMUNICATION DEVICES IN A HETEROGENEOUSLY DEPLOYED NETWORK

(71) Applicant: Telefonaktiebolaget L M Ericsson (publ), Stockholm (SE)

(72) Inventors: Bengt Lindoff, Bjärred (SE); Stefan Parkvall, Bromma (SE); Riikka Susitaival, Helsinki (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/654,737

(22) PCT Filed: Dec. 21, 2012

(86) PCT No.: PCT/EP2012/076720
§ 371 (c)(1),
(2) Date: Jun. 22, 2015

(87) PCT Pub. No.: WO2014/094885
PCT Pub. Date: Jun. 26, 2014

(65) Prior Publication Data
US 2015/0319802 A1    Nov. 5, 2015

(51) Int. Cl.
*H04W 4/00* (2009.01)
(Continued)

(52) U.S. Cl.
CPC ............ *H04W 76/048* (2013.01); *H04W 24/02* (2013.01); *H04W 52/28* (2013.01); *H04W 84/045* (2013.01); *H04W 88/06* (2013.01)

(58) Field of Classification Search
CPC .............................. H04W 36/06; H04W 76/04

USPC ................................ 455/422.1; 370/342, 311
See application file for complete search history.

(56) References Cited

U.S. PATENT DOCUMENTS

| 2011/0267955 | A1 | 11/2011 | Dalsgaard | |
|---|---|---|---|---|
| 2013/0121167 | A1* | 5/2013 | Wong | H04W 36/06 370/242 |
| 2014/0293858 | A1* | 10/2014 | Kalhan | H04W 36/0072 370/311 |

FOREIGN PATENT DOCUMENTS

| WO | 2009120124 A1 | 10/2009 |
|---|---|---|
| WO | 2011056252 A1 | 5/2011 |
| WO | 2012112098 A1 | 8/2012 |

OTHER PUBLICATIONS

International Search Report for PCT/EP2012/076720, mailed Sep. 19, 2013, 3 pages.
International Preliminary Report on Patentability for PCT/EP2012/076720, mailed Jan. 14, 2015, 6 pages.
(Continued)

*Primary Examiner* — Thomas Lett
(74) *Attorney, Agent, or Firm* — Withrow & Terranova, PLLC (57) ABSTRACT

A technique for operating a wireless communication device in a heterogeneously deployed network comprising first and second serving nodes of different nominal transmit powers and at least partially overlapping coverage areas is described. The communication device is simultaneously connected to the first and second serving nodes (e.g., in accordance with a soft cell scenario) and alternately communicates with the first and second serving nodes in accordance with a communication pattern comprising communication periods and communication pauses. A method aspect of this technique, as performed by the wireless communication device, comprises detecting an event that requires an extension of the communication period with the first serving node, and transmitting a notification message to the second serving node. The notification message is indicative of a required extension of a communication pause with the second serving node.

26 Claims, 8 Drawing Sheets

(51) Int. Cl.
*H04B 7/216* (2006.01)
*H04W 76/04* (2009.01)
*H04W 52/28* (2009.01)
*H04W 24/02* (2009.01)
*H04W 88/06* (2009.01)
*H04W 84/04* (2009.01)

(56) References Cited

OTHER PUBLICATIONS

Parkvall, Stefan et al., "Heterogeneous network deployments in LTE", Ericsson Review, No. 2, 2011, 3rd Generation Partnership Project (3GPP), 5 pages.

* cited by examiner

TECHNIQUE FOR OPERATING COMMUNICATION DEVICES IN A HETEROGENEOUSLY DEPLOYED NETWORK

This application is a 35 U.S.C. §371 national phase filing of International Application No. PCT/EP2012/076720, filed Dec. 21, 2012, the disclosure of which is incorporated herein by reference in its entirety.

TECHNICAL FIELD

The present disclosure generally relates to a heterogeneously deployed network with serving nodes of different nominal transmit powers and overlapping coverage areas. In particular, a technique for operating communication devices in such a network is presented.

BACKGROUND

Heterogeneously deployed networks with serving node of different nominal transmit powers and (at least partially) overlapping coverage areas are considered to be an interesting future deployment strategy for cellular networks. An introduction to such network deployments can be found in S. Parkvall et al., "Heterogeneous network deployments in LTE", Ericsson Review, No. 2, 2011, where LTE stands for the Long Term Evolution standard of the $3^{rd}$ Generation Partnership Project (3GPP).

Figure 1:
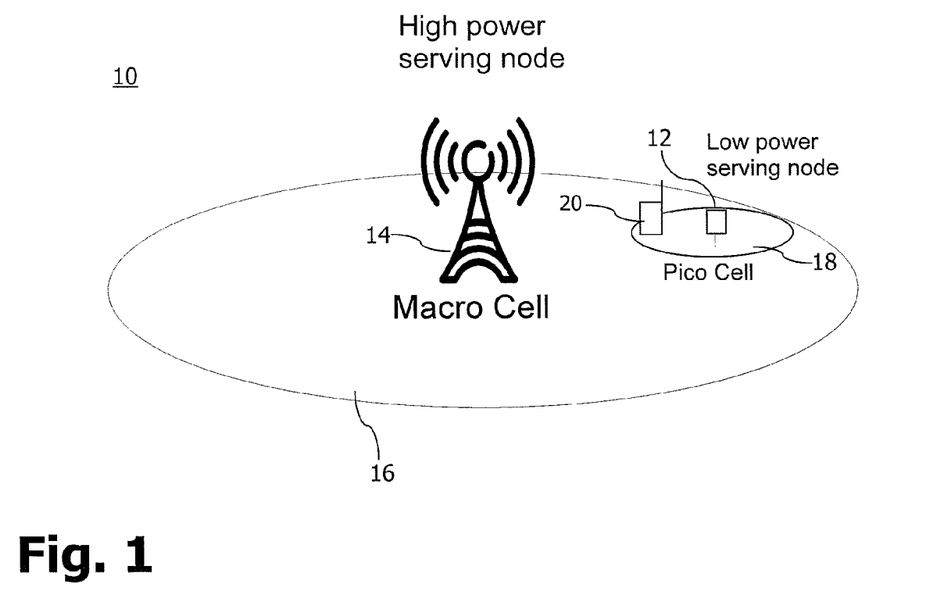

FIG. 1 illustrates an example of a heterogeneously deployed network 10 with multiple communication devices. Those devices include a low-power serving node 12, a high-power serving node 14 and a wireless communication device 20 that may be served by those serving nodes 12, 14. The low-power serving node 12 (in the following also called "pico node") typically offers high data rates (Mbit/s) and high capacity (users/m$^2$ or Mbit/s/m$^2$) in local areas where this is needed or desired. On the other hand, the high-power serving node 14 (in the following also called "macro node") is deployed to provide large-area coverage.

In practice the macro node 14 may correspond to an existing cell 16 (a "macro cell") of a mobile communication system, while the pico node 12 may be installed later to locally extend at least one of capacity and achievable data rate within the coverage area of the macro cell 16 (where needed). In the exemplary scenario illustrated in FIG. 1, the pico node 12 corresponds to a cell 18 of its own (a "pico cell"). This means that, in addition to downlink and uplink data transmission or reception, the pico node 12 also transmits the full set of common signals and channels typically associated with a cell.

Figure 2:
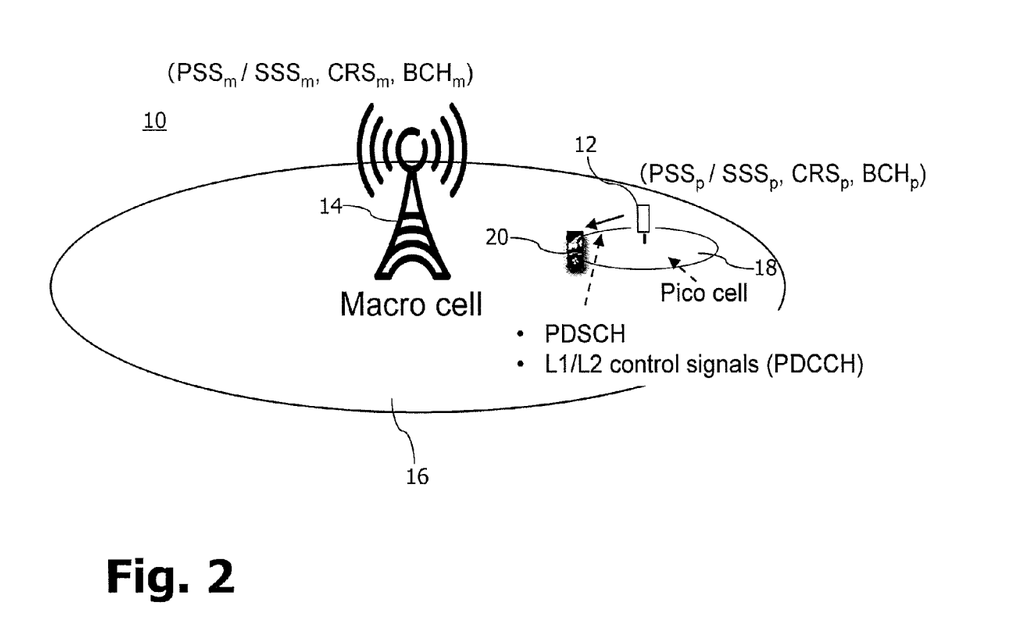
FIG. 2 shows a heterogeneous network deployment in which the pico node corresponds to a cell of its own.

In an exemplary LTE context as illustrated in FIG. 2, the signals and channels transmitted by the LTE-compliant pico node 12 for the wireless communication device 20 served (or to be served) by the pico node 12 include:

Primary and Secondary Synchronization Signals (PSS and SSS), corresponding to the Physical Cell Identity of the pico cell 18.

Cell-specific Reference Signals (CRS), also corresponding to the Physical Cell Identity of the pico cell 18. The CRS may, for example, be used for downlink channel estimation to enable coherent demodulation of downlink transmissions by the wireless communication device 20.

The Physical Broadcast Channel (PBCH), with corresponding pico-cell system information (additional system information may be transmitted on the Physical Downlink Shared Channel, PDSCH).

As the pico node 12 illustrated in FIG. 2 corresponds to a cell 18 of its own, also so-called Layer 1 (L1) and Layer 2 (L2) control signaling on the Physical Downlink Control Channel (PDCCH) (as well as on the Physical Control Format Indicator Channel, PCFICH, and the Physical Hybrid-ARQ Indicator Channel, PHICH) are transmitted from the pico node 12 to the connected wireless communication device 20. Such L1/L2 control signaling is performed in addition to downlink data transmission on the PDSCH and provides, for example, downlink and uplink scheduling information and Hybrid-ARQ (HARQ)-related information to the wireless communication device 20 within the pico cell 18.

It will be appreciated that similar signals and channels will be transmitted by the macro node 14. The communication between the wireless communication device 20 and the pico node 12 on the one hand and the macro node 14 on the other can occur on the same frequency, or carrier, or on different frequencies, or carriers.

Figure 3:
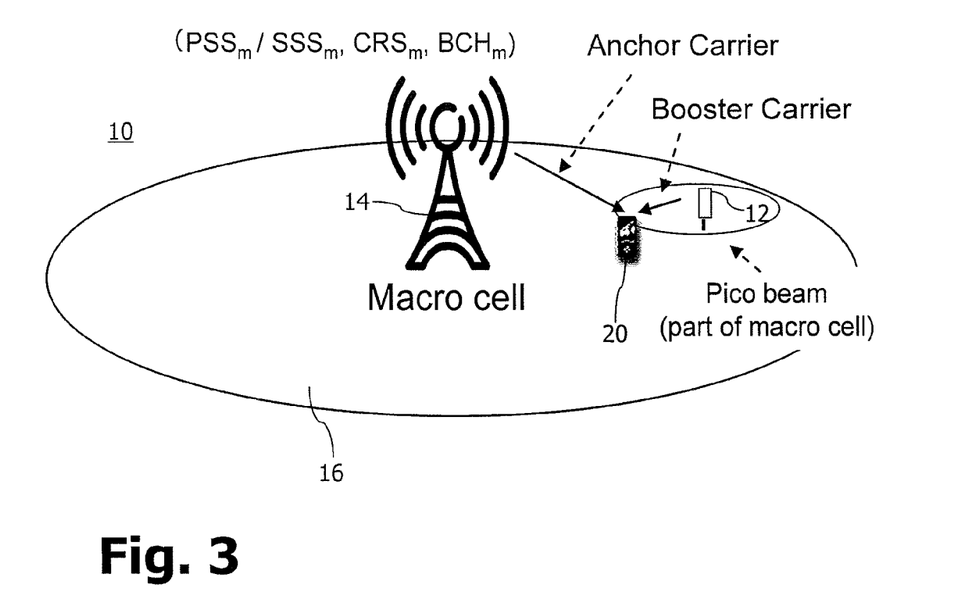
FIG. 3 illustrates a heterogeneous network deployment with a soft cell configuration that may be adopted in a connection with an embodiment of the present disclosure.

As an alternative to the deployment scenario illustrated in FIG. 2, the wireless communication device 20 in the coverage area of the pico node 12 may be simultaneously connected to the pico node 12 and the macro node 14 as illustrated in FIG. 3. In such a connection scenario, the pico node 12 within the heterogeneous network deployment need not correspond to a cell of its own but may just provide a data-rate or capacity "extension" of the macro cell 16 as shown in FIG. 3. Such a deployment is sometimes also referred to as "soft cell" (or "shared cell").

In a soft cell deployment as illustrated in FIG. 3, the wireless communication device 20 may maintain a so-called anchor carrier to the macro node 14. The anchor carrier is primarily used for transmitting and receiving control information. Moreover, the wireless communication device 20 may maintain a so-called booster carrier to the pico node 12. The booster carrier is primarily used for transmitting user data.

The wireless communication device 20 may in certain implementations be configured to alternately communicate with the pico node 12 and the macro node 14 in accordance with a communication pattern that comprises communication periods and communication pauses. Such a configuration may, for example, be adopted in a scenario in which the anchor carrier and the booster carrier are deployed on different frequencies while the wireless communication device is configured for single carrier operation.

SUMMARY

There is a need for enhancing the interworking of communication devices in a heterogeneously deployed network in connection with a communication pattern that comprises communication periods and communication pauses.

According to a first aspect, a method of operating a network component in a heterogeneously deployed network that comprises first and second serving nodes of different nominal transmit powers and at least partially overlapping coverage areas is provided, wherein a wireless communication device is simultaneously connected to the first and second serving nodes and alternately communicates with the first and second service nodes in accordance with a communication pattern comprising communication periods and communication pauses. The method is performed by one of the wireless communication device and the first serving node and comprises detecting an event that requires an extension of a communication period between the wireless communication device and the first serving node, and sending a notification message to the second serving node, wherein the notification message is indicative of a required extension of a communication pause with the second serving node.

In one implementation, the wireless communication device communicates with the first and second serving nodes on first and second carrier frequencies, respectively, wherein the first carrier frequency is different from the second carrier frequency. This implementation corresponds to a frequency-separated deployment of the heterogeneous network. In an alternative configuration, the first carrier frequency and the second carrier frequency may be identical ("same-frequency deployment").

The wireless communication device may be configured for single carrier operation. Such a configuration may be the result of hardware restrictions or of a software-based mode setting (in the latter case the wireless communication device may have a hardware configuration that in principle allows for a multi-carrier operation). In case the wireless communication device is configured for single carrier operation, it may switch between different first and second carrier frequencies in accordance with the communication pattern.

The communication pattern may comprise two dedicated sub-patterns, wherein a first sub-pattern is defined for communication with the first serving node and a second sub-pattern is defined for communication with the second serving node. The two sub-patterns may be defined such that overlapping communication pauses between the two sub-patterns are allowed, whereas overlapping communication periods are prevented. Alternatively, there may exist a single communication pattern for the first and second serving nodes that is defined such that a communication period the first serving node defines a communication pause for the second serving node, and vice versa.

The communication pattern may be defined by discontinuous reception (DRX) cycles. Alternatively, or in addition, the communication pattern may be defined by discontinuous transmission (DTX) cycles. The individual cycles may have a pre-defined or variable duration. One such cycle may comprise one communication period (for transmission and/or reception) and one communication pause. Of course, also a non-cyclic communication pattern may be defined.

The first serving node may be associated with at least one of a larger nominal transmit and a larger nominal coverage area than the second serving node. As an example, the first serving node may be a macro node, and the second serving node may be a micro, pico or nano node. As another example, the first serving node may be a micro or pico node, and a second serving node may be a nano node.

The first and second serving nodes may be deployed to define a soft cell for the wireless communication device. In such a deployment an anchor carrier may extend between the wireless communication device and the first serving node ("anchoring node"), while a booster carrier may extend between the wireless communication device and the second serving node ("boosting node"). The anchor carrier may be configured to primarily transmit control information, for example related to managing the network connection of the wireless communication device. The booster carrier may be configured to primarily transmit user data.

The event that requires an extension of a communication period between the wireless communication terminal and the first serving node may be detected in various ways. As an example, detecting the event may comprise receiving an indicator message by the wireless communication device from the first serving node, wherein the indicator message indicates the required extension of the communication period with the first serving node. Additionally, or as an alternative, the first serving node may locally detect the event that it requires an extended communication period with the wireless communication device. The indicator message may, for example, be a Medium Access Control (MAC) message. Additionally, or as an alternative, the message may be received via a Random Access Channel (RACH).

In another implementation the step of detecting the event may comprise determining that at least one of user data and control information is still received from the first serving node after a predefined point in time. The predefined point in time may mark an instant at which the reception operation at the wireless communication device (and thus the transmitting operation of the first serving node) should have ended. The predefined point in time may be defined by expiry of a timer, such as at least one of a DRX timer and a DTX timer.

The event may be defined or associated with at least one of a start and/or end of a DRX cycle underlying the communication with a first serving node, a start and/or end of a DRX operation for a communication with a first serving node, a start and/or end of using one or more short DRX cycles for the communication pattern with the first serving node, and a Hybrid Automatic Repeat Request (HARQ) feedback signal from and/or to the first serving node.

The notification message transmitted to the second serving node may be configured as a MAC message, or as a physical layer flag. The notification message may be transmitted on the RACH or the PUSCH, in particular in cases in which the method is performed by the wireless communication device. The method may, of course, alternatively or simultaneously be performed by the first serving node. In such a case the notification message may be sent over the X2 interface or, generally, a backhaul network. Optionally, the notification message may signal one or more of a start, an end and a duration of the required extension of the communication pause with the second serving node. Of course, the notification message could signal additional or alternative items of information.

According to another aspect a method of operating a serving node in a heterogeneously deployed network comprising first and second serving nodes of different nominal transmit powers and at least partially overlapping coverage areas is provided, wherein a communication device is simultaneously connected to the first and second serving nodes and alternately communicates with the first and second serving nodes in accordance with a communication pattern comprising communication periods and communication pauses. The method is performed by the second serving node and comprises receiving a notification message from at least one of the wireless communication device and the first serving node, the notification message being indicative of a required extension of a communication pause with the second serving node as an extension of a communication period between the wireless communication device and the first serving node is required, and extending the communication pause in response to receipt of the notification message.

The notification message may signal one or more of a start, an end and a duration of the required extension of the communication pause with the second serving node. In such a case, the method according to the second aspect may further comprise extending the communication pause in accordance with the signalling.

Also provided is a computer program product comprising program code portions for performing the steps of any of the methods and method aspects presented herein when the computer program product is executed by one or more processing devices, such as one or more processors installed on one or more of the devices presented herein. The computer program product may be stored on a computer-readable recording medium such as a CD-Rom, DVD, semiconductor memory, and so on. The computer program product may also be provided for download via a communication network such as the Internet or any other network.

Further provided is a network component for a heterogeneously deployed network comprising first and second serving nodes of different nominal transmit powers and at least partially overlapping coverage areas, wherein a wireless communication device is simultaneously connected to the first and second serving nodes and alternatively communicates with a first and second serving nodes in accordance with a communication pattern comprising communication periods and communication pauses. The network component is one of the wireless communication device and the first serving node and comprises a detector configured to detect an event that requires an extension of a communication period between the wireless communication device and the first serving node, and a first interface configured to transmit a notification message to the second serving node, the notification message being indicative of a required extension of a communication pause with the second serving node.

The wireless communication device may be configured to be connected to the second serving node via a booster carrier configured to primarily transmit user data. Moreover, the wireless communication device may be configured to be connected to the second serving node via an anchor carrier configured to primarily transmit control information.

The wireless communication device may further comprise a second interface configured to receive an indicator message from the first serving node. The message may indicate required the extension of the communication period with the first serving node. The event may be detected by the detector based on the indicator message. Additionally, or as an alternative, the detector may be configured to determine that at least one of user data and control information is received from the first serving node after a predefined point in time, and to detect the event based on that determination. The predefined point in time may defined by expiry of a timer.

Generally, the event may be defined by or associated with DRX-based procedures or HARQ-based procedures as generally described herein. In one implementation the notification message signals one or more of a start, an end and a duration of the required extension of the communication pause with the second serving node.

According to a still further aspect a serving node for use in heterogeneously deployed network comprising first and second serving nodes of different nominal transmit powers and least partially overlapping coverage areas is provided, wherein a wireless communication device is simultaneously connected to the first and second serving nodes and alternatively communicates with a first and second serving nodes in accordance with a communication pattern comprising communication periods and communication pauses. The serving node is the second serving node and comprises an interface configured to receive a notification message from at least one of the wireless communication device and the first serving node, the notification message being indicative of the required extension of a communication pause with the second serving node as an extension of a communication period between the wireless communication device and the first serving node is required, and a controller configured to extend the communication pause in response to receipt of the notification message.

The notification message may signal one or more of a start, an end and a duration of the required extension of the communication pause with the second serving node. In such a case the controller may further be configured to extend the communication pause in accordance with the signalling.

BRIEF DESCRIPTION OF THE DRAWINGS

Further details, aspects and advantages of the present disclosure will become apparent from the following description of exemplary embodiments in conjunction with the exemplary drawings, wherein FIG. 1 exemplarily shows a heterogeneous network deployment with a macro node of a higher nominal transmit power and a pico node of a lower nominal transmit power.

DETAILED DESCRIPTION

In the following description of exemplary embodiments, for purposes of explanation and not limitation, specific details are set forth, such as specific network node configurations and cellular network types, to provide a thorough understanding of the present disclosure. It will be apparent to one skilled in the art that the technique presented herein may be practiced in other embodiments that depart from these specific details. The skilled person will appreciate, for example, that while the following embodiments will partially be described in terms of LTE networks, the technique presented herein is not limited to being implemented according to any specific 3GPP or non-3GPP standard. Moreover, while the following embodiments will primarily be described from the perspective of the wireless communication device acting as the network component that detects the event and transmits the notification message, it should be noted that the corresponding operations could also be performed by a first serving node that transmits the corresponding notification message to a second serving node.

Moreover, while the technique presented herein will primarily be discussed in connection with macro nodes and pico nodes, it will be appreciated that the present disclosure is not limited to any particular type of serving node and could, for example, also be implemented using combinations of macro and micro nodes or of pico and nano nodes. As will be apparent, nano nodes have still lower nominal transmit powers than pico nodes, and micro nodes have higher nominal transmit powers than both pico and nano nodes. Accordingly, any exemplary reference to a macro node herein shall be construed to simply refer to a serving node of a higher nominal transmit power, while any reference to a pico node shall be construed to refer to a serving node of a relatively lower nominal transmit power. Terms such as "macro", "micro", "pico" and "nano" are thus to be construed to be only illustrative for the purpose of expressing differences in nominal transmit powers.

Those skilled in the art will further appreciate that the methods, steps and functions discussed herein may be implemented using individual hardware circuitry, using software functioning in conjunction with a programmed microprocessor or a general purpose computer, using one or more Application Specific Integrated Circuits (ASICs), one or more Digital Signal Processors (DSPs) and/or one or more Field Programmable Gate Arrays (FPGAs). It will also be appreciated that the methods, steps and functions disclosed herein may be embodied in a processor and a memory coupled to the processor, wherein the memory stores one or more programs that cause the processor to perform the steps discussed herein when executed by the processor.

Embodiments of the present disclosure can be practiced in a heterogeneous network 10 as exemplarily illustrated in FIG. 3 and as generally described above. In the embodiment of FIG. 3, the network 10 comprises a single pico node 12 located within the coverage area of a single macro node 14. It should be noted that in other embodiments multiple pico nodes 12 may be provided within the coverage area of the macro node 14. The pico node 12 and the macro node 14 are each configured as a network access point (e.g., as a base station, NodeB, eNodeB, or a Wireless Local Area Network access point).

While only one wireless communication device 20 is shown in FIG. 3, the respective network access points can be detected and selected by multiple such devices comprised by the network 10. The wireless communication devices 20 may be configured as mobile telephones, smartphones, data or network cards, tablet computers, laptop or stationary computers, machine-type devices (i.e., autonomous devices requiring no user interaction) and so on with wireless network access capabilities towards one or both of the pico node 12 and the macro node 14. As an example, the wireless communication device 20 may be compliant with the LTE or LTE-Advance communication standard.

As shown in FIG. 3, the wireless communication device 20 maintains an anchor carrier to the macro node 14 ("anchoring node"). The anchor carrier is primarily used for transmitting control information on the PDCCH (such as one or more of the CRS, PBCH, PSS and SSS, mobility-related signaling, Radio Resource Control, RRC, etc.) from and to the macro node 14. The wireless communication device 20 further maintains a booster carrier to the pico node 12 ("boosting node"). Via the booster carrier, the PDSCH is transmitted. To allow for demodulation and detection of the PDSCH despite the fact in certain configurations no CRS is transmitted from the pico node 12, so-called Demodulation Reference Signals (DM-RSs) may be transmitted from the pico node 12 together with the PDSCH. The DM-RSs, which are terminal-specific, can then be used by the wireless communication device 20 for PDSCH demodulation and detection.

Figure 4:
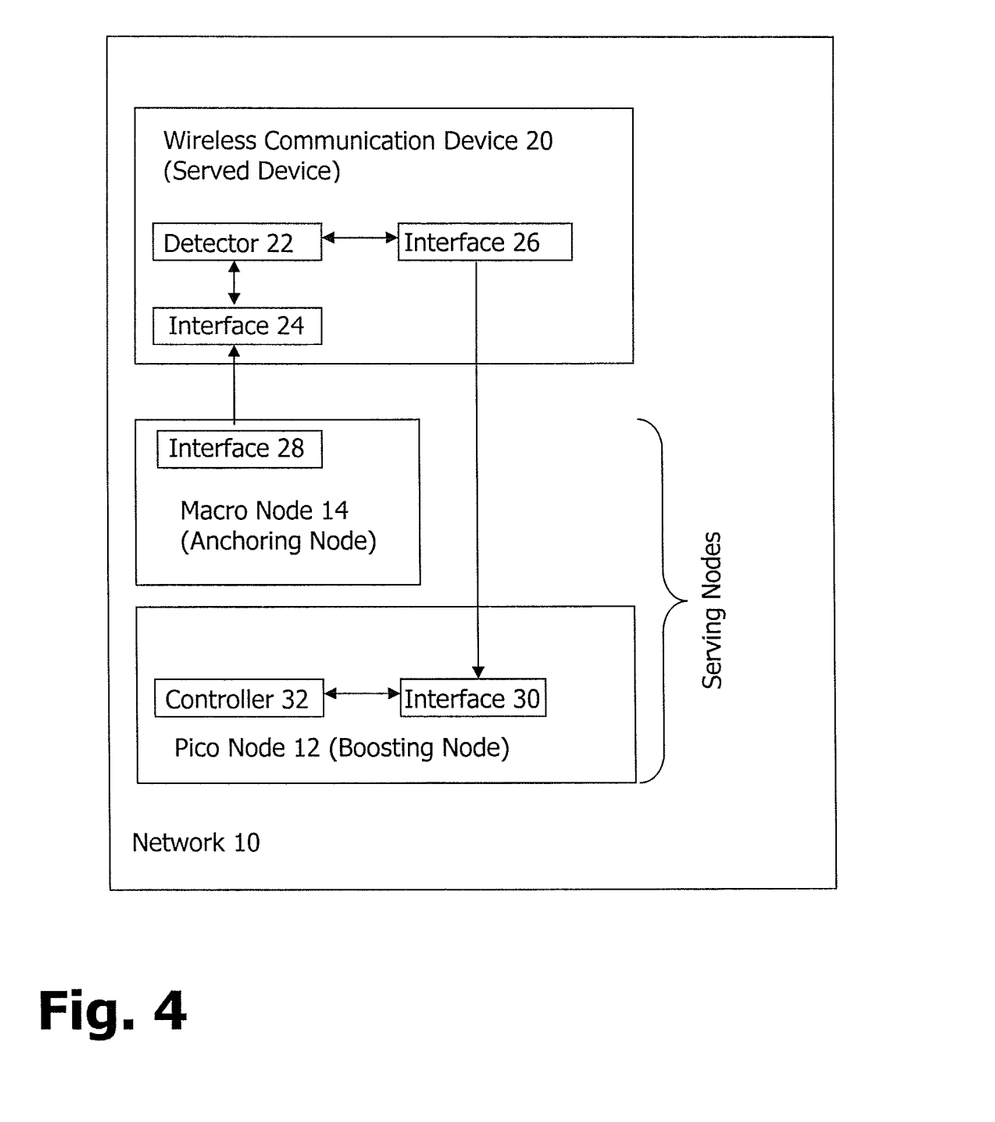
FIG. 4 schematically illustrates an embodiment of communication devices for operation in the deployment scenario illustrated in FIG. 3.

FIG. 4 illustrates in a block diagram some of the internal components of the pico node, or boosting node, 12, the macro node, or anchoring node, 14 and the wireless communication device, or served device, 20 suitable for carrying out the technique presented herein. As shown in FIG. 4, the wireless communication device 20 comprises a detector 22, a receiving interface 24 and a transmitting interface 26. The macro node 14 comprises a transmitting interface 28, and the pico node 12 comprises a receiving interface 30 and a controller 32.

The operation of the individual components illustrated in FIG. 4 will be now described in more detail with reference to the flow diagram 500 of FIG. 5. The flow diagram 500 illustrates the operation of the wireless communication device 20, the macro node 14 and the pico node 12 in connection with a communication pattern that permits the wireless communication device 20 to alternately communicate with the macro node 14 and the pico node 12. The communication pattern comprises communication periods and communication pauses.

The detector 22 is configured to detect in an initial step 502 an event that requires an extension of a communication period with the macro node 14. The event may be receipt of an indicator message via the receiving interface 24 from the macro node 14. This message may indicate the required extension of the communication period with the macro node 14, so that the detector 22 detects the event based on the indicator message. As illustrated in FIG. 4, the macro node 14 comprises the transmitting interface 28 for transmitting the indicator message to the wireless communication device 20.

According to the technique presented herein, the wireless communication device 20 is simultaneously connected to the pico node 12 and the macro node 14 and alternately communicates with the pico node 12 and the macro node 14 in accordance with communication periods and communication pauses. Due to that communication pattern, the required extension of the communication period with the macro node 14 may in certain cases require an extension of a communication pause with the pico node 12. For this reason, the detector 22 or any other component of the wireless communication device 20 is configured to determine, responsive to receipt of the indication message from the macro node 14, if an extension of a communication pause with the pico node 12 is required. If so, the detector 22, or any other component of the wireless communication device 20, generates a notification message indicative of the required extension of the communication pause. The notification message thus generated is then transmitted, in step 504, via the transmitting interface 26 from the wireless communication device 20 to the pico node 12.

In step 506, the pico node 12 receives the notification message from the wireless communication device 20 at its receiving interface 30. As explained above, the notification message indicates a required extension of a communication pause between the pico node 12 and the wireless communication device 20 (as the wireless communication device 20 requires an extension of the communication period with the macro node 14).

Generally, the notification message may be used to signal one or more of the following events or items of information: leaving the long DRX cycle operation, the start of using short DRX cycles, the period of time during which short DRX cycles will be used, the length of a continuous communication pause, one or more start or stop times for short DRX cycles, the duration of short DRX cycles (e.g., a length in subframes or ms), start or stop (e.g., in sub-frames or ms) of reception of retransmissions, and so no.

The wireless communication device 20 may be configured to enter a DRX mode with an (optional) short DRX cycle after a certain period of time in which no transmission has been received. This means that the device 20 will go to sleep and wake up at short DRX cycles. If new data comes in, such data can thus be delivered quickly because the device 20 only sleeps for short time periods. The short DRX cycle mode has a configurable timer (short DRX cycle timer). Upon expiry of that timer, if no data was received during the short DRX cycle mode, the device 20 enters a long DRX cycle. Obviously, the long DRX cycle is more power efficient for the device 20 than the short DRX cycle but further increases latency time.

Receipt of the notification message in step 506 is communicated to the controller 32 of the pico node 12. The controller 32 then extends, in step 508, the communication pause. In certain configurations, the notification message may specifically signal a duration of the required extension of the communication pause with the pico node 12. In such a case, the controller 32 may extend the communication pause in accordance with the signaled duration. In other embodiments, the notification message may simply be a flag (e.g., a physical layer flag) or any other indicator that triggers an extension of the communication pause. In such a scenario, multiple notification messages may be transmitted from the wireless communication device 20 to the pico node 12 so as to also signal an end of the communication pause (or a further extension).

Figure 5:
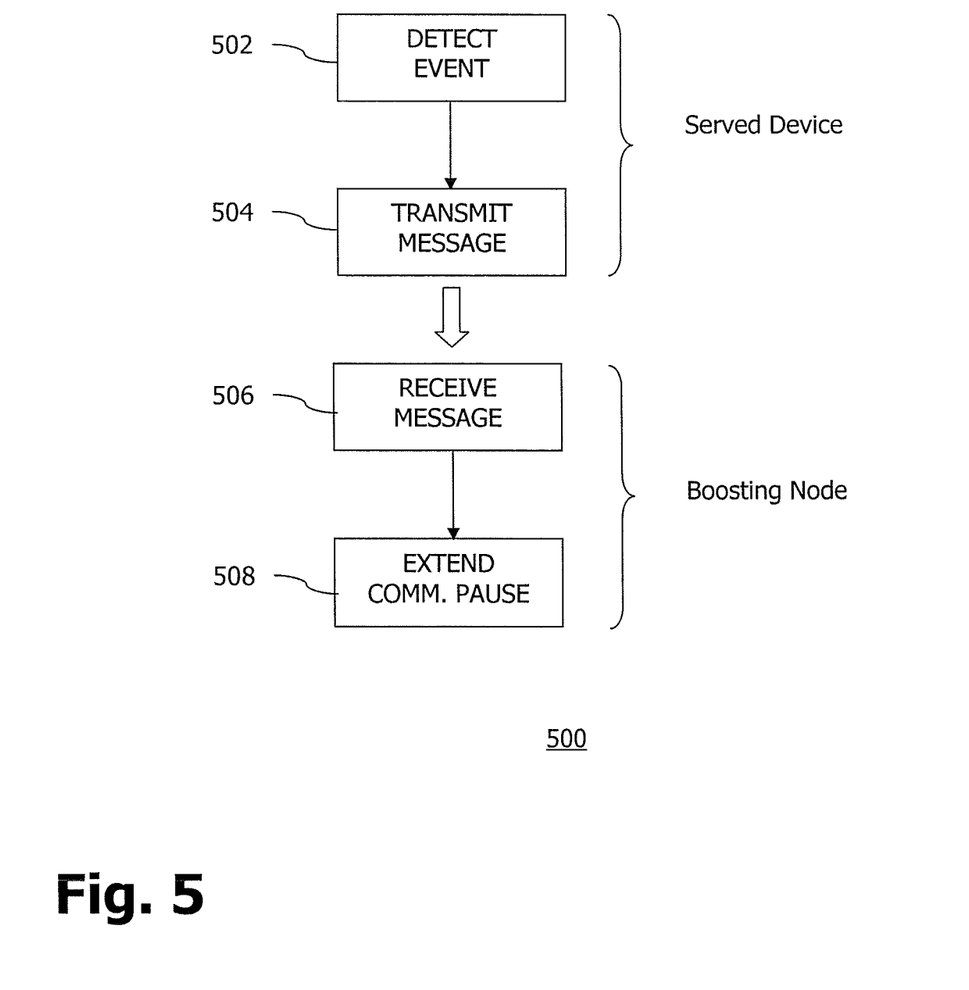
FIG. 5 shows a flow diagram illustrating a first method embodiment.

In FIGS. 4 and 5 an embodiment has been described in which the wireless communication device 20 acts as component for detecting an event and for subsequently transmitting a notification message to the pico node 12. It should be noted that the corresponding operations could also be performed by the macro node 14 in addition to or instead of the wireless communication device 20. In such a case, the macro node 14 would comprise a detector 22, a receiving interface 24 and a transmitting interface 26 similar or identical to those described above. In an exemplary implementation, the notification message could be sent from the macro node 14 to the pico node 12 via a dedicated interface over a backhaul network. As an example, the X2 interface could be used to that end as will be described in more detail below.

Figure 6:
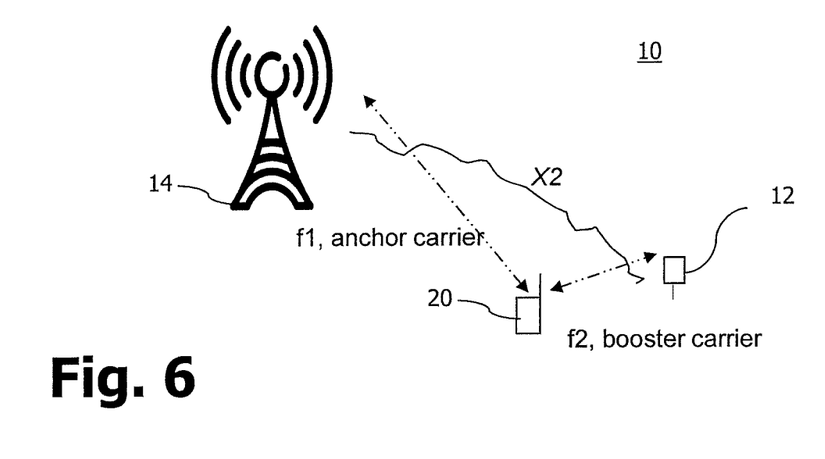
FIG. 6 illustrates a heterogeneous network deployment for a soft cell configuration that may be adopted in a connection with a further embodiment of the present disclosure.

In the following embodiment, that is based on the embodiment described above with reference to FIGS. 3 to 5, it will be assumed that the anchor carrier is associated with a first carrier frequency f1 and the booster carrier is associated with a second carrier frequency f2 different from the first carrier frequency f1, as illustrated in FIG. 6. It should be noted that in principle different carrier frequencies may be used in the uplink and in the downlink or both the anchor carrier and the booster carrier.

It will further be assumed that the wireless communication device 20 is configured to support only single carrier operation. As an example, the wireless communication device 20 may be a low-end terminal or modem that only supports single carrier operation due to hardware restrictions. This means that at each time instant the wireless communication device 20 can only communicate with one of the anchor carrier and booster carrier (as it has to perform a frequency switching operation there between). It should be noted, however, that in other embodiments the wireless communication device 20 could also support multiple carrier frequencies simultaneously, so that no such frequency switching operation will be required to transmit and/or receive on the anchor carrier and booster carrier.

It will further be assumed that the communication pattern defining the communication pauses and the communication periods is at least partially defined by a DTX and/or DRX scheme that is separately defined for each of the anchor carrier frequency f1 and the booster carrier frequency f2. In the following embodiments a communication pattern based on DRX cycles will exemplarily be discussed in more detail. It will be understood that in other embodiments the communication pattern may additionally, or as an alternative, be based on DTX cycles.

Figure 7:
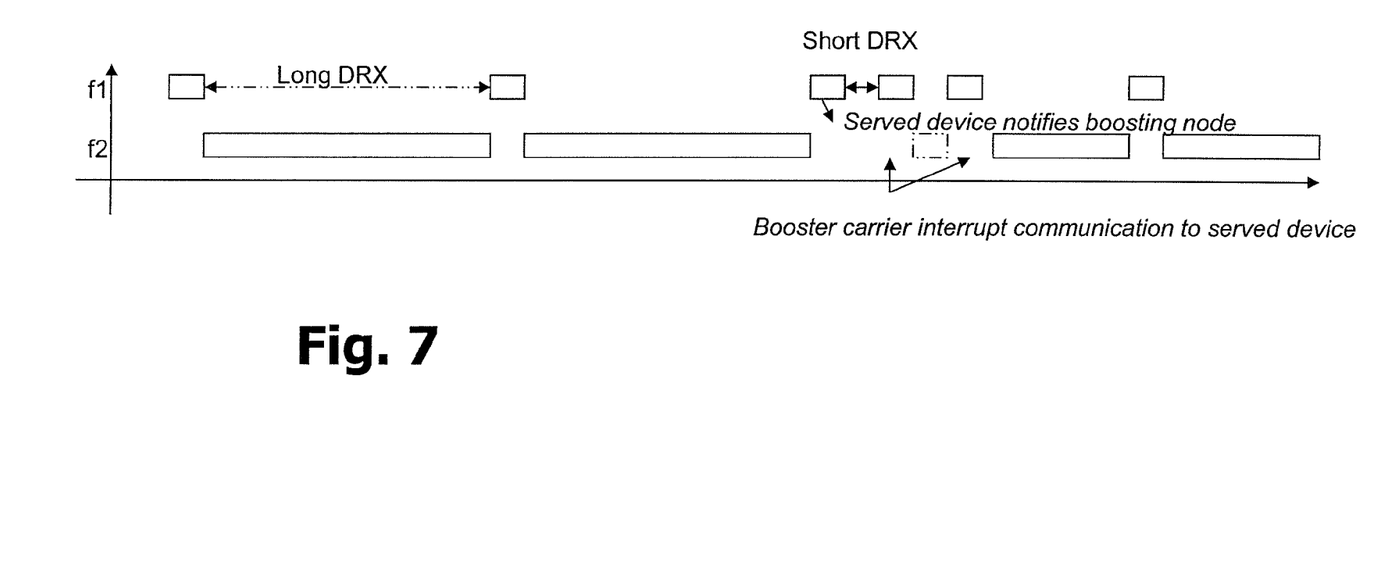
FIG. 7 schematically illustrates a communication scenario based on a communication pattern according to an embodiment of the present disclosure.

An exemplary DRX scheme as illustrated in FIG. 7 comprises a dedicated DRX sub-pattern for each of the anchor carrier frequency f1 and the booster carrier frequency f2, wherein the individual sub-patterns are aligned such that there is no overlap between transmissions on the two carrier frequencies f1, f2. In other words, the and DRX periods are split in accordance with Time Division Multiplexing (TDM). The alignment of the DRX cycles on the carrier frequencies f1 and f2 may be synchronized via a communication link between the macro node 14 and the pico node 12. The communication link may be based on the LTE X2 interface as schematically illustrated in FIG. 6.

In a typical usage scenario as illustrated in FIG. 7, the amount of information transmitted via the anchor carrier is comparatively small (as an example, control information related to mobility, RRC configuration, Radio Resource Management, RRM, or Voice over Internet Protocol, VoIP may be transmitted). Hence, a long DRX cycle is used for the communication between the macro node 14 and the wireless communication device 20 (which corresponds to long communication pauses). During the communication pauses of the DRX cycles on the anchor carrier, the wireless communication device may communicate (i.e., transmit and/or receive) on the booster carrier.

If it is determined that more information is to be transmitted on the anchor carrier outside the DRX cycles the resulting transmission period may extend into a DRX phase on the anchor carrier and, thus, overlap with a transmission on the booster carrier. Obviously, the wireless communication device 20 thus has to prioritize such communication of control information on the anchor carrier over user data communication on the booster carrier. As the need for such a prioritization will typically not be known to the pico node 12, the pico node 12 has to be informed that its (scheduled) communication period has to be delayed or shortened.

It has been found that the signaling protocol underlying the X2 interface (see FIG. 6) may in certain cases not be suitable for notifying by the macro node 14 the pico node 12 of the fact that the macro node 14 requires an extension of its communication period. As an example, to implement the required fast X2 signaling the resource consumption for the backhaul network underlying the X2 interface will have to be substantially increased. On the other hand, without signaling, the pico node 12 may simply start transmission to the wireless communication device 20, without the wireless communication device 20 having the possibility to listen. As such, spectral resources and network capacities would be wasted. In order to avoid such a waste, the detector 22 of the wireless communication device 20 is configured to detect the requirement of extending a communication period with the macro node 14 and transmit a corresponding notification message to the pico node 12 as discussed above. Such a reporting does not rely on the X2 interface and thus saves resources in terms of the backhaul network. It should be noted that depending on the capacity of the backhaul network, in other embodiments the event that requires an extension of a communication period between the wireless communication device 20 and the macro node 14 could also be locally detected by the macro node 14 using a detector similar to the detector 22 of the wireless communication device 20 as described above. In such a case, the notification message could be generated locally by the macro node 14 and could be transmitted to the pico node 12 via the X2 interface or another interface in the backhaul network.

Regardless, X2 interface between the macro node 14 and the pico node 12 may be used for signaling (e.g., semi-static) DRX cycle parameters, such as one or more of the usage of long and short DRX cycles, timer settings (e.g., of an on timer and/or an inactivity timer) and a DRX cycle length. The DRX cycle parameters may be defined, or synchronized, as explained above such that the cycles for the anchor carrier and the booster carrier are aligned. The alignment ensures that activities (e.g., "on durations") do not collide for the anchor carrier and the booster carrier.

An on timer defines a period of time ("on duration") the wireless communication device 20 must be active and monitor DL control channels even if no data is received or transmitted. After new data has been received or transmitted, the inactivity timer is started (or re-started). When this timer is running, the wireless communication device 20 needs to continue control channel monitoring (even after the on timer has expired, or timed out), and if no control information is received during that time, the device 20 may go to sleep. Hence, this could be used as an event, or indicator, of whether a longer "on duration" is needed. So the inactivity timer specifically defines how long the wireless communication device 20 at least needs to be active and monitor for example the PDCCH. The inactivity timer is restarted for each new reception or transmission even during an "on duration". On the other hand, the on timer is a static timer started at the beginning of each DRX cycle, which determines how long the device 20 needs to be active and do the monitoring even if there is no data activity. The inactivity timer may be started even when the on timer is running.

Figure 8:
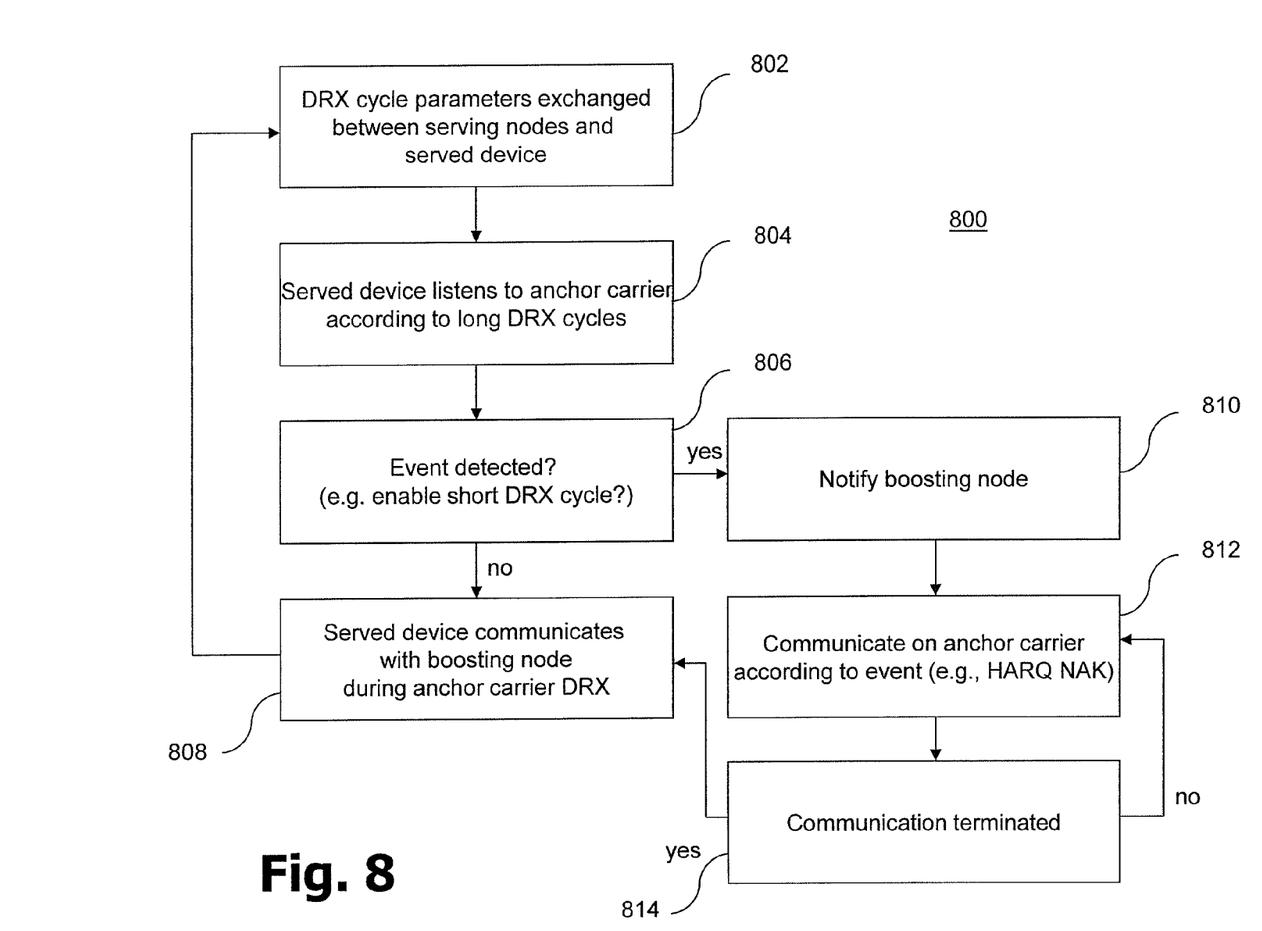
FIG. 8 shows a flow diagram illustrating a second method embodiment.

In the following, the DRX-based communication pattern exemplary illustrated in FIG. 7 will be described in more detail with reference to exemplary flow diagram 800 of FIG. 8. In an initial step 802, DRX cycle parameters are communicated between the serving nodes (i.e., between the macro node 14 and the pico node 12) over the X2 interface. Additionally, the DRX cycle parameters are communicated by the serving nodes 12, 14 to the served device (i.e., the wireless communication device 20).

In the embodiment reflected in FIG. 7, the served device 20 during operation listens to the anchor carrier in accordance with the long DRX cycles (step 804). Unless an event that requires an extension of a communication period on the anchor carrier is detected in step 806, the wireless communication device 20 communicates on the booster carrier during the long inactive periods on the anchor carrier (step 808). This communication based on long DRX cycles on the anchor carrier is continued until new DRX cycle parameters are communicated, and the method starts anew in step 802.

If, on the other hand, it is detected in step 806 that more information is to be communicated on the anchor carrier than possible (or allocated) in accordance with the long DRX cycles, it is detected by the wireless communication device 20 that the communication period on the anchor carrier needs to be extended (step 806). Such an event is either autonomously detected by the wireless communication device 20 or signaled to the wireless communication device 20 on the anchor carrier. As an example, the macro node 14 may, during a non-DRX period, transmit an indicator message to the wireless communication device 20 as discussed above in connection with FIG. 4. This indicator message may, for example, instruct the wireless communication device 20 to leave the long DRX cycle and to use a short DRX cycle as illustrated in FIG. 7. Alternatively, the wireless communication device 20 may be instructed to switch off DRX operation completely.

Responsive to detecting the event in step 806, the wireless communication device 20 generates and transmits, in step 810, a notification message to the pico node 12 as discussed above. In the specific example shown in FIG. 7, the notification message may notify the pico node 12 of the start time and stop time of the short DRX cycle. In another embodiment, the parameters for the short DRX cycle may be preconfigured or exchanged between the serving nodes 12, 14 via the X2 interface. In such a case the notification message transmitted by the wireless communication device 20 may simply contain a flag or a few information bits related to the start of using a short DRX cycle. The notification message may be transmitted from the wireless communication device 20 to the pico node 12 via the ordinary PUSCH in case the wireless communication device 20 has a scheduling grant. Otherwise, the RACH may be used. Moreover, alternatively, new uplink channels may also be used for transmitting the notification message to the pico node 12, such as signaling on reserved PUCCH resources or a contention-based channel designed solely for the purpose of DRX signaling. The reserved PUCCH resources may be semi-statically configured (i.e., non-permanently), for example via RRC. Alternatively, the DRX signaling may be transmitted on a channel shared by multiple user (e.g., a contention-based channel). The notification message may be transmitted as a MAC message or as a physical layer flag. The notification message may alternatively also be transmitted using RRC signaling.

After having notified the pico cell 12 in step 810, communication on the anchor carrier takes place to exploit the extended communication period in accordance with the detected event, such as a HARQ-based event (step 812). Once it is determined in step 814 that the extended communication on the anchor carrier has terminated, the method proceeds to step 808. In the specific embodiment of FIG. 7, the anchor carrier communication may thus return to long DRX cycles. This fact may optionally be signaled to the pico node 12 (in case corresponding information has not yet been sent together with the notification message in step 810).

The embodiment discussed above with reference to FIGS. 7 and 8 is based on a predefined, or scheduled, communication pattern. In another embodiment, scheduled and unscheduled communication periods for the anchor carrier and the booster carrier may be enabled with the DRX mechanism (e.g., as specified in 3GPP Technical Specification 3.6.321). In such an implementation, communication on the anchor carrier or the booster carrier to the wireless communication device 20 may start during "on durations" (i.e., communication periods) of each serving node 12, 14 as defined by parameters for long DRX cycles.

It may occur that one or a sequence of "on durations" on the anchor carrier is/are not enough to complete communication for the anchoring node 14. In such a case the anchoring node 14 needs to extend the communication period. In this connection, the anchoring node 14, during a non-DRX period, signals to the wireless communication device 20 to leave the long DRX cycle and to move to an active state (i.e., to deactivate DRX operation). This signaling can be based on the received PDCCH (optionally for a new transmission in a similar manner as the normal DRX mechanism). Upon receipt of the corresponding indicator message from the macro node 14, the wireless communication device 20 reports to the boosting node 12 that it is scheduled on the anchor carrier for an extended period of time and thus cannot receive or transmit on the booster carrier. Optionally, the wireless communication device 20 may also report the period of time it is expected to monitor the anchor carrier. That period of time may also comprise the period of time defined by the DRX inactivity timer.

After the wireless communication device 20 is no longer scheduled to monitor the anchor carrier, it may first indicate to the boosting pico node 12 that it is using a short DRX cycle on the anchor carrier (e.g., for an intermediate period of time). Alternatively, the wireless communication device 20 may indicate that it does not use DRX at all (i.e., that it is continuously transmitting and receiving on the anchor carrier during a specific time period that may comprise the time period defined by the DRX inactivity timer).

Then, later on (e.g., after expiration of a short DRX cycle timer), the wireless communication device 20 may inform the pico node 12 that it is using the long DRX cycle again. Optionally, the pico node 12 itself also maintains one or both of a DRX inactivity timer and a short DRX cycle timer. The wireless communication device 20 may then inform the pico node 12 about the start time of one or both of these timers. When the DRX inactivity timer expires, the pico node 12 assumes that the wireless communication device 20 is from now on using short DRX cycles. Similarly, when the short DRX cycle timer expires, the pico node 12 may assume that the wireless communication device is again entering long DRX cycles. In both cases the pico node 12 may adapt its communication pattern for the boosting carrier accordingly.

The pico node 12 may take scheduling information in relation to the extended communication period with the macro node 12 into account. As an example, the pico node may hold user data scheduling on the boosting carrier during the entire period of short DRX cycles, or may restrict a scheduling of boosting carrier transmissions to the DRX instants during a short cycle DRX period.

The preceding embodiments have generally been described with respect to the detection of events that require the anchor carrier communication to leave long DRX cycles for no DRX operation, or for short DRX cycles, so as to extend the communication period with the wireless communication device 20. As understood herein, the communication period with the wireless communication device 20 may either be extended by extending a scheduled duration of a communication period or by scheduling more communication periods than scheduled.

An exemplary event triggering an extended communication period may be related to a HARQ (e.g., a Negative Acknowledgement, NACK) feedback of a data packet received on the anchor carrier. In the following, an embodiment directed to a HARQ-based event scenario will be described in more detail.

In case the wireless communication device 20 detects an erroneous data packet from the anchoring macro node 12 in the downlink, the wireless communication device 20 needs to transmit a HARQ NACK message and then wait for a retransmission of the data packet. Such an event is, of course, of an "unexpected nature", and hence it is typically not feasible for the anchoring macro node 14 to inform the boosting pico node 12 over the X2 interface thereof. For this reason the notification approach discussed above in connection with the previous embodiments could be exploited.

Once an erroneous detection of a data packet occurs, the wireless communication device 20 not only transmits a HARQ NACK to the anchoring macro node 14, but also a notification message (e.g., a short "halt" signal) to the pico node 12. The corresponding "halt" signal may be shorter than a sub-frame (e.g., it may be transmitted in a slot or a few Orthogonal Frequency Division Multiplexing, OFDM, symbols), but may also be signaled within the regular PUCCH, RACH or PUSCH structure.

Responsive to receipt of the notification message, the pico node 12 may temporarily halt communication on the boosting carrier until the retransmission on the anchor carrier has occurred. Here, different variants for how long the pico cell 12 may need to halt the transmission on the booster carrier can be envisioned. A first example could be a fixed period of time, for instance defined in a standard or otherwise, or agreed on over the X2 interface. In another example, communication on the booster carrier may be halted until a "release" signal (similar to the "halt" signal) is received from the wireless communication device 20. In another example, the two serving nodes 12, 14 have negotiated a suitable period of time in advance.

When an uplink transmission has occurred on the anchor carrier, the wireless communication device 20 is expected to receive a HARQ ACK/NACK from the anchoring macro node 14. Similar to the downlink scenario described above, the wireless communication device 20 can inform the boosting pico node 12 of this reception and the (potential) need of a retransmission using a similar "halt" signal as described above. For the uplink, the wireless communication device 20 may also be required to monitor adaptive retransmission grants once every HARQ Round Trip Time (RTT) on the anchoring carrier until the corresponding data has been flushed from an uplink HARQ buffer. After receipt of the corresponding notification message including the "halt" signal, the pico node 12 may refrain from transmitting to the wireless communication device 20 during time periods when such adaptive retransmission grants are expected. In one variant, to enable synchronous HARQ operation, the wireless communication device 20 may inform the pico node 12 about which HARQ processes have been used or reserved with respect to the macro node 12. This information can be signaled in the form of a subframe reservation bitmap or otherwise and may, for example, comprise subframes in which PDCCH/PDHICH information and PUSCH transmission is expected for certain HARQ processes. Based on this information, the pico node 12 may schedule transmission on the booster carrier in such a way that there is no collision with transmission on the anchoring carrier.

Currently, the DRX operation is specified per wireless communication device 20. This means that the wireless communication device 20 has only one set of DRX timers, and monitoring of downlink signals is aligned over different cells. In certain embodiments, the wireless communication device 20 may maintain independent DRX timers and, optionally, independent DRX states for each of the anchoring carrier and the booster carrier.

As has become apparent from the above description of exemplary embodiments, the present disclosure permits a fast information flow in a heterogeneously deployed network with two or more serving nodes that communicate with a served device using a communication pattern comprising communication periods and communication pauses. The technique may in particular be practiced in connection with a softcell scenario to enhance the communication flow between an anchoring cell and a boosting cell without consuming substantial resources of a backhaul network. As such, the network capacity as a whole is improved, and the communication speed and capacity requirements in the backhaul network can be relaxed.

Depending on the actual capacity of the backhaul network, in other implementations the backhaul network could be used for directly transmitting notification messages from one serving node to another serving node. In such an implementation, the resources of the wireless communication device could be relieved from operations such as event detection and notification message transmission.

While the technique presented herein has been described with reference to particular embodiments, those skilled in the art will recognize that the present invention is not limited to the specific embodiments described and illustrated herein. It is to be understood that this disclosure is only illustrative. Accordingly, it is intended that the invention be limited only by the scope of the claims appended hereto.

The invention claimed is:
1. A method of operating a network component in a heterogeneously deployed network comprising first and second serving nodes of different nominal transmit powers and at least partially overlapping coverage areas, wherein a wireless communication device is simultaneously connected to the first and second serving nodes and alternately communicates with the first and second serving nodes in accordance with a communication pattern comprising communication periods and communication pauses, wherein the wireless communication device is connected to the first serving node via an anchor carrier configured to primarily transmit control information, and wherein the wireless communication device is connected to the second serving node via a booster carrier configured to primarily transmit user data,
the method being performed by one of the wireless communication device and the first serving node and characterized by:
detecting, by a processor of the one of the wireless communication device and the first serving node, an event that requires an extension of a communication period on the anchor carrier between the wireless communication device and the first serving node; and
transmitting, by the processor of the one of the wireless communication device and the first serving node, a notification message to the second serving node, the notification message being indicative of a required extension of a communication pause on the booster carrier with the second serving node.

2. The method of claim 1, wherein
the wireless communication device communicates with the first and second serving nodes on first and second carrier frequencies, respectively, wherein the first carrier frequency is different from the second carrier frequency.

3. The method of claim 2, wherein
the wireless communication device is configured for single carrier operation and switches between the first and second carrier frequencies in accordance with the communication pattern.

4. The method of claim 1, wherein
the communication pattern is defined by at least one of discontinuous reception, DRX, cycles and discontinuous transmission, DTX, cycles.

5. The method of claim 1, wherein
the first serving node is associated with at least one of a larger nominal transmit power and a larger nominal coverage area than the second serving node.

6. The method of claim 1, wherein
the first and second serving nodes are deployed to define a soft cell for the wireless communication device.

7. The method of claim 1, wherein
detecting the event comprises receiving an indicator message from the first serving node, the indicator message indicating the required extension of the communication period with the first serving node.

8. The method of claim 1, wherein
detecting the event comprises determining that at least one of user data and control information is received from the first serving node after a predefined point in time.

9. The method of claim 8, wherein
the predefined point in time is defined by expiry of a timer.

10. The method of claim 1, wherein
the event is defined by or associated with at least one of:
start of a discontinuous reception, DRX, cycle underlying the communication with the first serving node;
end of a DRX cycle underlying the communication with the first serving node;
start of a DRX operation for the communication with the first serving node;
end of a DRX operation for the communication with the first serving node;
start of using one or more short DRX cycles for the communication pattern with the first serving node;
end of using one or more short DRX cycles for the communication pattern with the first serving node;
a Hybrid Automatic Repeat Request, HARQ, feedback signal from the first serving node; and
a Hybrid Automatic Repeat Request, HARQ, feedback signal to the first serving node.

11. The method of claim 1, wherein
the notification message is configured as a Medium Access Control, MAC, message, or as a physical layer flag.

12. The method of claim 1, wherein
the method is performed by the wireless communication device.

13. The method of claim 12, wherein
the notification message is transmitted on a Random Access Channel, RACH, or a Physical Uplink Shared Channel, PUSCH.

14. The method of claim 1, wherein
the method is performed by the first serving node.

15. The method of claim 14, wherein
the notification message is sent over an X2 interface.

16. The method of claim 1, wherein
the notification message signals one or more of a start, an end and a duration of the required extension of the communication pause with the second serving node.

17. A method of operating a serving node in a heterogeneously deployed network comprising first and second serving nodes of different nominal transmit powers and at least partially overlapping coverage areas, wherein a wireless communication device is simultaneously connected to the first and second serving nodes and alternately communicates with the first and second serving nodes in accordance with a communication pattern comprising communication periods and communication pauses, wherein the wireless communication device is connected to the first serving node via an anchor carrier configured to primarily transmit control information, and wherein the wireless communication device is connected to the second serving node via a booster carrier configured to primarily transmit user data,
the method being performed by the second serving node and characterized by:
receiving, by a processor of the second serving node, a notification message from at least one of the wireless communication device and the first serving node, the notification message being indicative of a required extension of a communication pause on the booster carrier with the second serving node as an extension of a communication period on the anchor carrier between the wireless communication device and the first serving node-is required; and
extending, by the processor of the second serving node, the communication pause in response to receipt of the notification message.

18. The method of claim 17, wherein
the notification message signals one or more of a start, an end and a duration of the required extension of the communication pause with the second serving node, and further comprising extending the communication pause in accordance with the signalled duration.

19. A network component for a heterogeneously deployed network comprising first and second serving nodes of different nominal transmit powers and at least partially overlapping coverage areas, wherein a wireless communication device is simultaneously connected to the first and second serving nodes and alternately communicates with the first and second serving nodes in accordance with a communication pattern comprising communication periods and communication pauses, wherein the wireless communication device is connected to the first serving node via an anchor carrier configured to primarily transmit control information, and wherein the wireless communication device is connected to the second serving node via a booster carrier configured to primarily transmit user data,     the network component being one of the wireless communication device and the first serving node and characterized by:

a detector configured to detect an event that requires an extension of a communication period on the anchor carrier between the wireless communication device and the first serving node; and         a first interface configured to transmit a notification message to the second serving node, the notification message being indicative of a required extension of a communication pause on the booster carrier with the second serving node.

20. The network component of claim 19, the wireless communication further comprising     a second interface configured to receive an indicator message from the first serving node, the indicator message indicating the required extension of the communication period with the first serving node, wherein the detector is configured to detect the event based on the indicator message.

21. The network component of claim 19, wherein the detector is part of the wireless communication device and configured to determine that at least one of user data and control information is received from the first serving node after a predefined point in time and to detect the event based on the determination.

22. The network component of claim 21, wherein the predefined point in time is defined by expiry of a timer.

23. The network component of claim 19, wherein the event is defined by or associated with at least one of:

start of a discontinuous reception, DRX, cycle underlying the communication with the first serving node;

end of a DRX cycle underlying the communication with the first serving node;

start of a DRX operation for the communication with the first serving node;

end of a DRX operation for the communication with the first serving node;

start of using one or more short DRX cycles for the communication pattern with the first serving node;

end of using one or more short DRX cycles for the communication pattern with the first serving node;

a Hybrid Automatic Repeat Request, HARQ, feedback signal from the first serving node; and a Hybrid Automatic Repeat Request, HARQ, feedback signal to the first serving node.

24. The network component of claim 19, wherein the notification message signals one or more of a start, an end and a duration of the required extension of the communication pause with the second serving node.

25. A serving node for use in a heterogeneously deployed network comprising first and second serving nodes of different nominal transmit powers and at least partially overlapping coverage areas, wherein a wireless communication device is simultaneously connected to the first and second serving nodes and alternately communicates with the first and second serving nodes in accordance with a communication pattern comprising communication periods and communication pauses, wherein the wireless communication device is connected to the first serving node via an anchor carrier configured to primarily transmit control information, and wherein the wireless communication device is connected to the second serving node via a booster carrier configured to primarily transmit user data, the serving node being the second serving node and characterized by:

an interface configured to receive a notification message from at least one of the wireless communication device and the first serving node, the notification message being indicative of a required extension of a communication pause on the booster carrier with the second serving node as an extension of a communication period on the anchor carrier between the wireless communication device and the first serving node is required; and     a controller configured to extend the communication pause in response to receipt of the notification message.

26. The serving node of claim 25, wherein the notification message signals one or more of a start, an end and a duration of the required extension of the communication pause with the second serving node, and wherein the controller is further configured to extend the communication pause in accordance with the signalled duration.

\* \* \* \* \*